(12) United States Patent
Harneit

(10) Patent No.: US 6,260,478 B1
(45) Date of Patent: Jul. 17, 2001

(54) HEAT DISTRIBUTION SYSTEM FOR A GRILL

(76) Inventor: Uwe Harneit, 1466 West Francis Avenue, Ontario (CA), 91762-6016

( * ) Notice: Subject to any disclaimer, the term of this patent is extended or adjusted under 35 U.S.C. 154(b) by 0 days.

(21) Appl. No.: 09/479,799

(22) Filed: Jan. 8, 2000

(51) Int. Cl.$^7$ .................. A47J 37/00; A47J 37/07
(52) U.S. Cl. .................. 99/446; 99/400; 99/401; 99/444; 99/447
(58) Field of Search .................. 99/339, 340, 400, 99/401, 444–450, 422–425, 481–482; 126/25 R, 9 R, 41 R, 9 A, 9 B; 219/443, 400, 452.11, 460.11; 426/523

(56) References Cited

U.S. PATENT DOCUMENTS

| | | |
|---|---|---|
| 2,874,631 | 2/1959 | Cooksley . |
| 4,608,917 | 9/1986 | Faaborg . |
| 4,683,867 | 8/1987 | Beatty . |
| 4,727,853 | 3/1988 | Stephan et al. . |
| 4,762,059 | 8/1988 | McLane, Sr. . |
| 5,265,586 | 11/1993 | Salerno . |
| 5,566,606 | 10/1996 | Johnston . |
| 5,752,433 | 5/1998 | Charlson et al. . |
| 5,890,422 | * 4/1999 | Clark et al. ............... 99/447 |
| 5,911,812 | * 6/1999 | Stanek et al. ............ 99/446 |
| 5,981,914 | * 11/1999 | Schultheis .............. 99/444 |

* cited by examiner

Primary Examiner—Timothy F. Simone
(74) Attorney, Agent, or Firm—Brande and McCleary; Lewis M. Brande; Thomas A. McCleary

(57) ABSTRACT

This invention describes a heat dissipation system that uses a pair of panels rotatably mounted in a grill, which allows a cook to equalize the heat radiated within a gas or electric grill to provide more even heat distribution and prevents wind from extinguishing the burner flame, even in the presence of a crosswind. A grease drainage system is also described for a gas or electric grill.

4 Claims, 2 Drawing Sheets

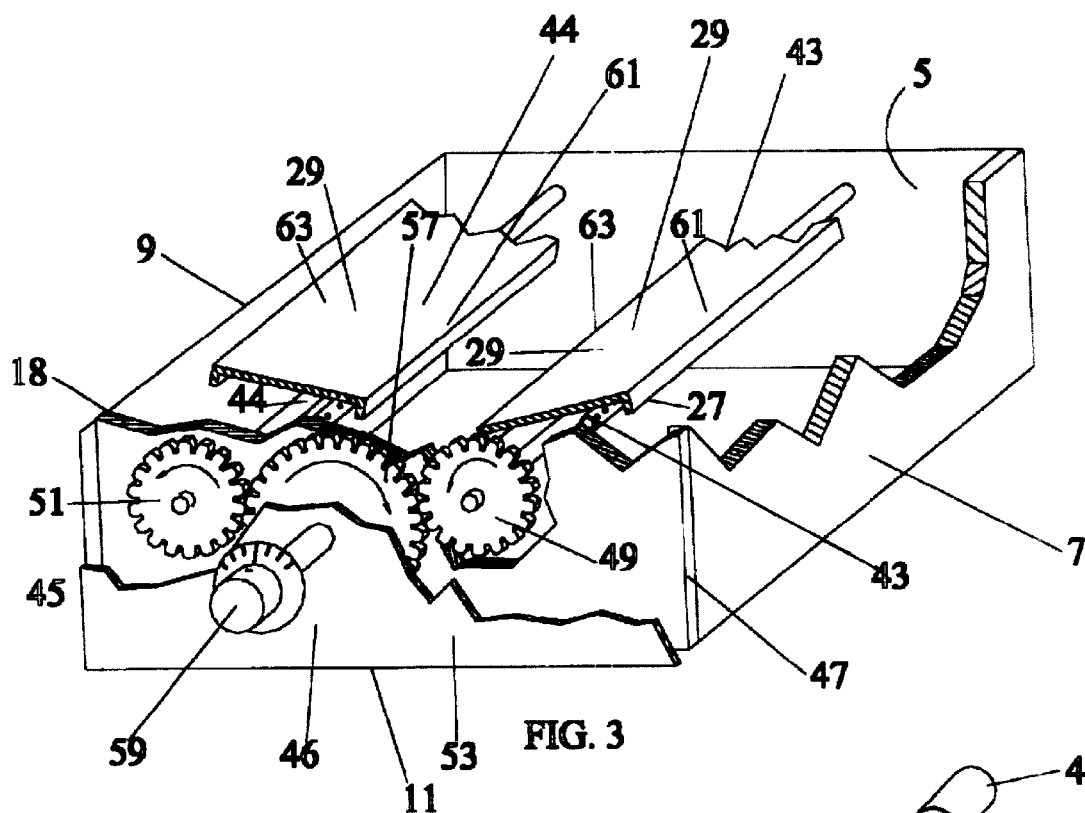
FIG. 3
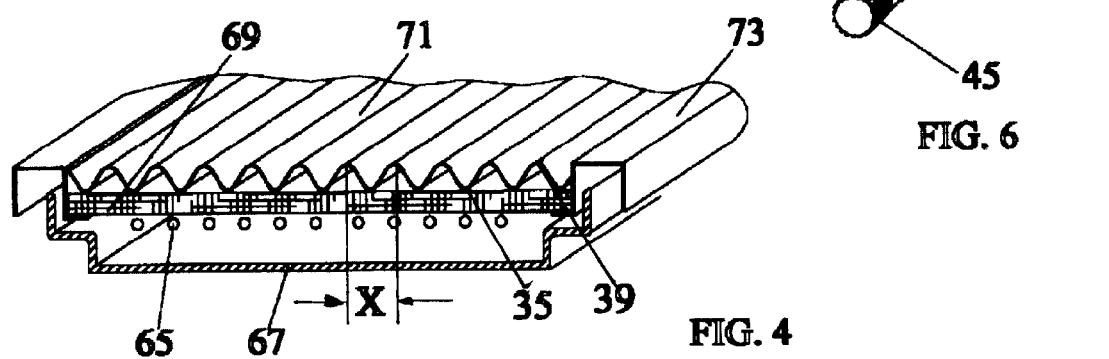
FIG. 4
FIG. 6
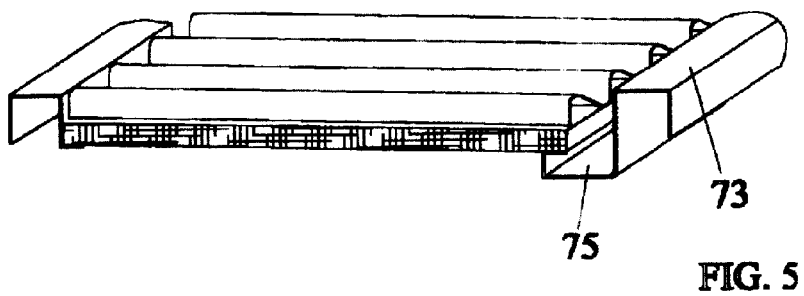
FIG. 5

HEAT DISTRIBUTION SYSTEM FOR A GRILL

BACKGROUND OF THE INVENTION

1. Field of the Invention

In a typical barbeque grill, there are two or more tube burners arranged with a burner cover, with the burner cover consisting of an angular or semi-circular piece of sheet metal placed at a set distance over the burner. The burner cover performs two functions: first, it prevents grease or fat from dripping onto the open flame which could cause a fire and secondly, it assists in achieving an even distribution of heat within the grill. So the burner cover serves as a drip panel for grease or fat, as well as a heat reflector.

There are also grills available on the market which have a layer of lava rock or porous ceramic plates arranged at a set distance from the burner. These types of grills use the lava rock or ceramic plates to serve the same functions as those with burner covers.

With either type of barbeque grill, it is desirable to obtain the greatest amount of even heating over the surface of the grill. This is true for both open and closed grills.

After using a barbeque grill, it's necessary to clean a number of parts inside the grill, as well as to clean the interior of the grill itself to remove fat, sauces, marinades, etc.

With any open barbeque grill, even distribution of the heat can be disrupted by a slight breeze. This can make the distribution of heat in the interior of the grill uneven, since any heat rising from the burners is deflected by the breeze.

With electric grills, attempts have been made to completely replace the grill grate with a plate of heat resistant glass or cast aluminum, thereby housing an electric burner in a sealed lower portion. This poses a problem as pieces of meat, such as steaks, tend to stick to the glass or aluminum plate. Fat and other drippings remain on the surface of the heat resistant glass or cast aluminum, since they cannot drain off the plate, until they're burnt to soot. Air does not circulate around the steak, which causes the steak to develop a bitter taste. The steak will also lack the typical dark stripes found on steaks cooked on a conventional grill.

This invention attempts to solve these problems by creating a grill interior that's as easy to clean as possible, by developing a grill that is not sensitive to breezes when food is cooked with the grill open. When used as a closed grill, cooking a steak or other meats without acquiring a bitter taste and forming the typical dark stripes one would expect on a steak grilled.

2. Description of the Prior Art

U.S. Pat. No. 4,683,867 discloses a barbeque grill that has drip panels disposed below the cooking grate that supports the food. The drip panels are attached to the barbeque housing by mounting bolts that are welded to the drip panels. The mounting bolts extend through the grill housing and use a friction mechanism and a locking nut system to hold them in position relative to the burners. The drip panels cannot be moved in relationship to each other since there is no mechanical linkage between them. They are independently adjusted to the desired position, rotationally and transnationally (up and down). Drippings from the food contact the panels and are vaporized with the excess draining towards a grease evacuation system defined in the bottom of the grill housing. The invention also discloses that the drip panels redirect radiant heat, which causes the rear of the grill to be cooked slower than the front of the grill.

This is substantially different than the present invention, as the present invention does not have adjustable drip panels. The drip panels are held in a fixed position to allow the food drippings to drain away towards the center of the grill housing where a grease gutter collects the grease for future cleaning. The present invention also has infinitely adjustable heat dissipation panels which radiate heat and also prevent wind from extinguishing the flame from the burners. A most notable difference is that the drip panels in the present invention are located below the burners, where in the disclosed invention the burners are located below the drip panels and below a grate to hold lava rocks.

U.S. Pat. No. 4,727,853 discloses a sear grid for a portable grill. The sear grid replaces lava rock that is very popular in barbeque grills. The sear grid is located above the burners and allows grease to evaporate preventing uncontrolled flare-ups during cooking. The sear grid is a series of V shaped heat-conductive material members, where the V apex is pointed upwards. A plurality of these V shaped members are located above the burners and spaced, creating a grid.

U.S. Pat. No. 5,752,433 discloses a barbeque grill where the burner is designed to allow grease to be vaporized on its surface without clogging the burner holes. The firebox has angled sides to drain liquids coming from the cooking grate.

U.S. Pat. No. 4,762,059 discloses a cooking grill that has a series of grease collector plates that are mounted so as to be inclined and overlying an adjacent bar which prevents grease from hitting the burner and igniting. The grease collector plates can be pivoted away from the flame source. The primary purpose of the patent is to provide a means to collect the grease prior to dripping onto the burner which will cause grease fires.

U.S. Pat. No. 5,566,606 discloses a barbecue grill that is deep and has a cup at the bottom to collect grease from the cooked foods. The bottom is angled to direct the grease into the cup. The firebox has a tongue to assist the grease into the bottom of the firebox when the cover of the barbecue is closed.

U.S. Pat. No. 4,265,586 discloses a barbeque grill that has deflectors that catch grease. The deflectors are situated at an acute angle above a heat chamber that has a baffled floor structure to direct heat to the overlying cooking grate.

The above disclosed patents have an underlying theme of attempting to eliminate the grease fires that occur when grease drips onto an open flame from a gas burner. The various attempts are similar in that they are angled panels that direct the drippings away from the burner, which eliminates the fire. The various disclosed patents attempt to vaporize the grease in order to provide an enhanced flavor to the cooked food. None of these patents disclose an infinitely variable heat dissipation panel that prevents the burners from being extinguished by a side wind by causing the heat dissipation panels to vary their angles, which minimizes or virtually eliminates the effects of side winds.

SUMMARY OF THE INVENTION

The current invention is a system for distributing heat evenly throughout the interior of a gas grill utilizing a pair of drip panels, a multiplicity of heat distributing metal panels and a corrugated metal grate in conjunction with multiple burner tubes. Another purpose of this invention is a system to drain grease away from the cooked food to a drip pan, which can be removed for draining and cleaning.

This invention incorporates heat distributing sheet metal panels arranged lengthwise at a predetermined distance over the individual tube burners. The metal panels are bent along at least one of their long edges, so that grease dripping off the grill will run off and not build up in the bottom of the panel and drop on the flames from the tube burners. The metal panels are located on attachment devices, such as angles or pins, which can be attached to the sides of the grill by welding, screwing or indenting the attachment devices into the side of the grill. The metal panels are, therefore, easily removed from the grill for cleaning. Alternatively, the metal panels can be slid into slots in the side wall of the grill from one side to rest on a support on the opposite side, while being held in place with pins or other attachment devices through their protruding ends.

The heat distributing metal panels are arranged to lay diagonally over the tube burners or electric heating elements so that the heat rising from below the metal panels is redirected, to achieve even heating on the entire surface of the grate.

To maintain even heat distribution on open grills, the metal panels can be equipped with stub axles that lead to the outside of the grill. A lever or knob can be attached to this axle to allow the angle of the metal panel to be changed.

By setting the heat distribution panels diagonally, the heat outlet on the windward side can be increased, while the metal panels on the downwind side can be lessened to achieve an even heat distribution in the grill. Even heating can thus be achieved even if a crosswind is present.

If the grill has two or more tube burners or two or more electric heating elements, the axles of the heat distributing metal panels can be interconnected to allow a single regulating knob to adjust the diagonal settings of the metal panels. This will result in equalizing the heat output within the grill, even in the presence of a crosswind, so the crosswind would have little or no influence on food being grilled on the grill.

Alternatively, a tube burner can be turned on it's own axis, which changes the angle of the flame outlet openings. The heat of the exiting flames will increase or decrease the amount of heat to the heat distributing panels, thus allowing the chef to equalize the heat output within various portions of the grill.

With either design, the amount of heat is increased when a breeze is present so that the wind carries this additional heat and assists in evenly cooking the meat being grilled.

The heat distribution panels can be made of sheet metal (possibly enameled) or heat resistant glass held in a frame. Heat distribution panels made of glass have the additional advantage of being transparent, so the cook will be able to observe the burner flames from above.

The heat distribution panels are loosely held in place by their narrow ends in a complementary support. So they are easily removed from the grill for simple cleaning. Any dirt, grease residues, etc. that gets into the grill through the grate is directed into a drip pan via drip panels.

The drip panels can also be easily removed from the grill for cleaning. One edge of the lower part of the grill appliance is flared slightly to the outside. The drip panels, with a folded edge, are simply placed over the flared edge of the lower part of the grill appliance. There is sufficient bearing surface on the drip panel and on the lower part of the grill appliance so that, even if the grill is shaken, the drip panels will not fall into the grill appliance.

Bends at the lower edges of the drip panels direct any drippings into a collecting pan. It is preferable to have the downward bent of the drip panel a little lower into the drip pan than the upper edge of the drip pan itself. After removing the drip pans from the lower part of the grill, the drip collecting pan can be removed for cleaning.

Another design incorporates a grill grate consisting of either one integrated part or several small parts. This grate consists of a corrugated metal sheet where the valleys of the corrugations have long slots through which grease can drip onto the drip panels or the heat distribution panels. The width of these long slots should be no greater than ¼" to avoid having the grilled food fall into the lower part of the grill. The heat from the burner will collect under the corrugations and spread evenly over the entire width and length of the grate, thus ensuring even heating. Because the heat from the burners has to pass over the inside of the corrugations before it passes through the drip slots, the peaks of the corrugations will maintain the same temperature as the valleys, even though the valleys are closer to the burners.

The slots located in the valleys between the corrugations can be in varying lengths and distances from each other. The distance is determined by the heat distribution inside the lower part of the grill. The distance of the individual corrugations from each other is determined by the distance desired to impart dark stripes on the food. The grate can be enclosed in a cast iron frame, if desired.

An analogous design with a corrugated grate with drip slots or holes in the valleys can be used in conjunction with electric heating elements or gas burners that are underneath a heat resistant glass surface. The grate is simply placed on top of the glass and a steak, for example, will cook without developing a bitter taste. The grate can either be placed directly on the glass or it can be held in a frame.

An advantage to the heat resistant glass design is that regardless of which plate covering is used, either the glass or the cast iron plate covering, grease is less likely to be able to run out to the sides of the grate. In addition, a grease gutter is included on one or more sides of the glass plate.

BRIEF DESCRIPTION OF THE DRAWINGS

The figures show in detail:

FIG. 3 shows a partial section through a gas grill appliance with adjustable heat distribution panels.

FIG. 4 shows a cross-section through an electrically heated grill with a panel of high temperature resistant glass as a covering under the grill grate.

FIG. 5 shows a partial cross-section through a grill appliance with a high temperature resistant glass panel under the grill grate.

FIG. 6 shows a detailed view an axle.

DETAILED DESCRIPTION

Figure 1:
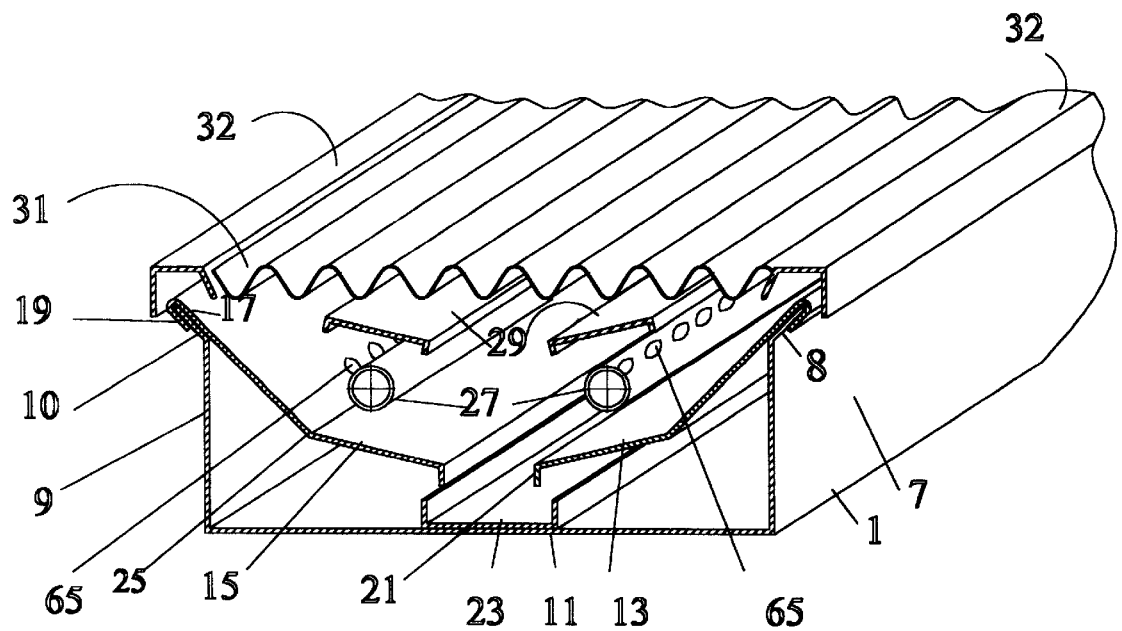
FIG. 1 shows a cross-section through a gas grill appliance.

In FIG. 1, which represents a first embodiment of the invention, a cross-section of the grill design is shown, in which a grill basin (1) has a first sidewall (7) and a second sidewall (9) opposing each other and being attached to a bottom surface (11) of the grill basin (1). The first sidewall (7) has a first edge (8), and the second sidewall (9) has a second edge (10). The first edge (8) and the second edge (10) each being flared outwardly from the first sidewall (7) and the second sidewall (9) of the grill basin (1). A first drip panel (13) is inserted over the first outwardly flared edge (8) of the first sidewall (7) and a second drip panel (15) is inserted over the second outwardly flared edge (10) of the second sidewall (9) on the grill basin (1). The first drip panel

(13) is crimped on the first outwardly flared edge (8) of the first sidewall (7) and the second drip panel (15) is crimped on the second outwardly flared edge (10) of the second sidewall (9), where the first outwardly flared edge (8) and the second outwardly flared edge (10) provides a bearing surface (17) for each of the drip panels (13,15). The bearing surface (4) provides an area on which the drip panels (13,15) lie on the outwardly flared edges (8,10). The drip panels (13,15) each have opposing edges. One edge or crimp (19) encloses each of the outwardly flared edges (8,10). The edge opposing the crimp, has a downward turned flange or drain-off end (21). In this embodiment, it is preferred to select a manufacturing tolerance for each crimp (19) which makes it possible to hold the drip panels (13,15) parallel to each of the outwardly flared edges (8,10) preventing the drain-offends (21) from resting on a drip pan (23) located on the bottom surface (11) of the grill basin (1). The drip pan (23) can be removed from the grill basin for draining and for cleaning.

In a preferred embodiment of the present invention, each of the drip panels (13,15) has a radius (25) that helps prevent warping of the drip panels (13,15) by the heat from a pair of burners (27) located in the grill basin (1) above said drip panels (13,15).

A pair of heat distribution panels (29) are located in the grill basin (1) and are positionally arranged over each of the burners (27) in order to provide an even a distribution of heat, which is radiated toward a grate (31). The grate (31) can be held in a frame (32) with the frame (32) loosely mounted on each of the outwardly flared edges (8,10) of the grill basin (1). The grate (31) can also be made in one or more pieces and can incorporate the frame (32) and grate (31) as one piece.

Figure 2:
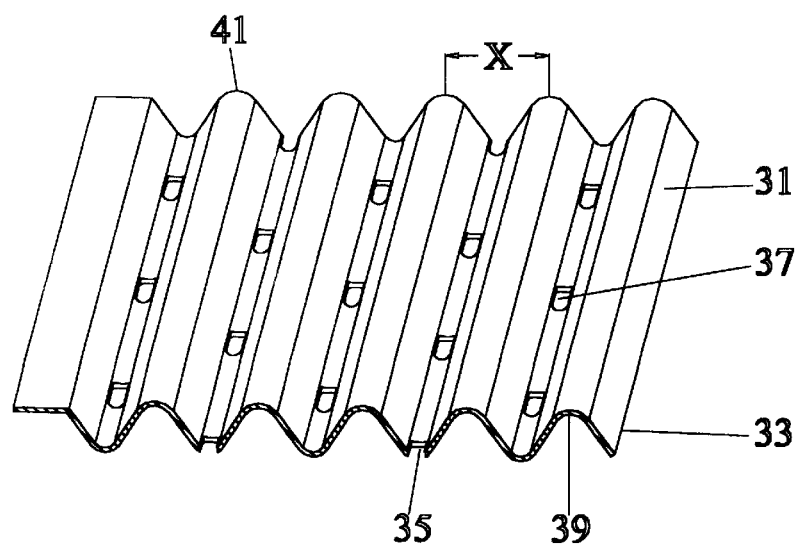
FIG. 2 shows a section of a grill grate.

FIG. 2 shows a one-piece cooking surface or grate (31), which is made of sheet metal that has corrugations (33). The corrugations (33) are defined by peaks (39) and troughs (35). The troughs (35) of the corrugations (33) have openings (37) cut into them. The openings (37) allow the grease from the food being grilled to drain away from the food. The heat accumulates underneath the peaks (39) of the corrugations (33) and distributes evenly over the peaks (39) and troughs (35). The entire grate (31) is therefore heated at an even temperature, even though the peaks (39) are further away from the burners (27) than the troughs (35). The distance or linear dimension, (X), between the peaks (39) gives the food being grilled the desirable dark stripes preferred on steaks, hamburgers, etc. A radius (41), located on the peaks (39), determines the width of the stripes.

FIG. 3 shows an embodiment that creates a uniform heat distribution in the grill during a side wind. In this design, a pair of heat distribution panels (29) each have a right side (61), and are located over the burners (27). One heat distribution panel (29) is connected to a first axle (43), the other heat distribution panel (29) is connected to a second axle (44), where each axle (43,44) has a splined end (45). A grill partition (47) is attached to the bottom surface (11), the first sidewall (7), and the second sidewall (9) of the grill basin (1). The grill partition (47) has holes defined therein to allow each axle (43,44) attached to the heat distribution panels (29) to pass therethrough. The grill basin (1) has a back wall (5) which is attached to the first sidewall (7), the second sidewall (9), and the bottom surface (11) of the grill basin (1) and opposes the grill partition (47). The back wall (5) has holes defined therein which are in line with the holes defined in the grill partition (47) creating a parallel relationship between the first axle (43) and the second axle (44) when inserted therethrough. An outer wall (53) of the grill basin (1) is also attached to the first sidewall (7), the second sidewall (9), and the bottom portion (11) of the grill basin (1) and is positioned to create a space between the outer wall (53) and the grill partition (47). A first gear (49) is attached to the splined end (45) of the first axle (43) and a second gear (51) is attached to a splined end (45) of the second axle (44). The first gear (49) and the second gear (51) are located in the space between the outer wall (53) and the grill partition (47). A third gear (57) is located between the partition (47) and the outer wall (53) of the grill basin (1). The third gear (57) positionally meshes with the first gear (49) and the second gear (51) and is centrally located therebetween. The grill partition (47) and the outer wall (53) of the grill basin (1) each have holes to positionally support the third gear axle (46) and positionally locates the third gear axle (46) between the first gear (49), and the second gear (51). An operating knob (59) is attached to a third gear axle (46) where the third gear axle (46) penetrates through the hole in the outer wall (53) of the grill basin (1).

If the operating knob (59) is turned to the right, as shown in figure three, the right sides (61) of the heat distributing panels (29) lift up, redirecting the heat from the burners (27) so that the grate (31) can be more strongly heated on the side of the grate (31) affected by the wind. The opposite sides (63) of the heat distributing panels (29) will move in a direction opposite of the right sides (61) of the heat distributing panels (29) when the operating knob (59) is turned. This allows the person barbequing to equalize the heat in the grill basin (1), even in a crosswind, by simply adjusting the operating knob (59), irrespective of which side of the grill the crosswind is on.

In FIG. 4, an electrically heated grill is shown in cross section. A plurality of electrical heating elements (65) are located directly under a heat distribution panel (69) made from a heat resistant material. A grate (71) is positioned on top of the heat distribution panel (69), which avoids imparting the bitter taste to the food when the food is being grilled directly on the heat distribution panel (69). The grate (71) is made of sheet metal and has corrugations (33). The corrugations (33) are defined by peaks (39) and troughs (35). Heat accumulates underneath the peaks (39) of the corrugations (33) and distributes evenly over the peaks (39) and troughs (35). The entire grate (71) is therefore heated at an even temperature, even though the peaks (39) are further away from the burners (27) than the troughs (35). The distance (X) between the peaks (39) gives the food being grilled the desirable dark stripes preferred on steaks, hamburgers, etc. A radius (41), located on the peaks (39), determines the width of the stripes. The grate (71) can be placed in a sealed or unsealed frame (73), which is supported by the heat distribution panel (69). The grate (71) will distribute the heat from the heat distribution panel (69) evenly to ensure homogenous cooking of the food being grilled.

FIG. 5 shows a design like FIG. 4 with an additional grease gutter (75) incorporated into the frame (73).

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A heat distribution system for a grill comprising:
   a) a grill basin, said grill basin comprising a first sidewall and a second sidewall opposing each other with each said first sidewall and said second sidewall attached to a bottom surface of said grill basin, said first sidewall having a first edge, said first edge being outwardly turned providing a bearing surface for a first drip panel, said second sidewall having a second edge, said second edge being outwardly turned and providing a bearing surface for a second drip panel, said first and said second drip panels each having a crimped end, said crimped end of said first drip panel being loosely slidable over said first edge and said crimped end of said second drip panel being loosely slidable over said second edge, with each said drip panel resting on said bearing surface of said outwardly turned edge, said first drip panel and said second drip panel each having a bend located thereon, said bend positionally locating a drain-off end located on said first drip panel and said second drip panel over a drip pan located on said bottom surface of said grill basin, a frame means is positioned on top of said crimped end of said first drip panel and said crimped end of said second drip panel providing support for a grate;
   b) said grate having a corrugated shape, said corrugated shape being defined by peaks and troughs, said troughs having openings defined therein to allow liquid and debris to drain away, said peaks separated by a linear dimension between said peaks to create burn marks on food, said grate further mating with said frame means positioned on top of said crimped end of said first drip panel and said crimped end of said second drip panel of said grill basin;
   c) said grill basin having a rear wall and a grill partition, each being attached to said first sidewall, said second sidewall and said bottom surface, said rear wall and said grill partition each having a pair of complementary holes defined therein opposing each other, a first axle being rotatably inserted into one pair of holes, a second axle being rotatably inserted into said other pair of holes and said first axle and said second axle being in a parallel relationship, said first axle having a heat distributing panel attached thereon, and said second axle having a heat distributing panel attached thereon, with said heat distributing panels located above a multiplicity of tube burners; and
   d) an outer wall, said outer wall of said grill basin being attached to said first sidewall, said second sidewall, and said bottom surface of said grill basin, said outer wall of said grill basin being positionally located creating a space between said outer wall and said grill partition, said first axle and said second axle each having a splined end, said splined end of said first axle and said second axle each being inserted through said holes in said grill partition, said first axle having a first gear mounted on said splined end of said first axle, said second axle having a second gear mounted on said splined end of said second axle, said first gear and said second gear being located in said space between said outer wall and said grill partition, said outer wall and said grill partition of said grill basin each having a hole defined therein, each hole being in line to support a third gear axle, said hole in said outer wall and said grill partition of said grill basin being located between said first gear and said second gear, a third gear which positionally meshes with said first gear and said second gear and is attached to said third gear axle so as to rotate when said third gear axle is rotated, causing said first axle and said second axle to rotate which rotationally positions said heat distribution panels attached to said first axle and said second axle to prevent a majority of heat loss due to wind.

2. The heat distribution system for a grill according to claim 1, in which said frame means and said grate are fabricated in one piece and are positionally fixed on said grill basin by said crimped end of said first drip panel and said crimped end of said second drip panel.

3. A heat distribution system for a grill comprising:
   a) a grill basin, said grill basin having a plurality of electrical heating elements, said electrical heating elements imparting heat to a heat distribution panel, said heat distribution panel being constructed from a heat resistant material, said heat distribution panel positionally locating a grate, said grate having a frame means; and
   b) said grate having a corrugated shape, said corrugated shape being defined by peaks and troughs, said peaks having a linear dimension between said peaks to create burn marks on food, said grate further mating with said frame means positioned on top of a first crimped end of a first drip panel and a second crimped end of a second drip panel of said grill basin.

4. The heat distribution system for a grill according to claim 3, in which said frame means incorporates a grease gutter, said grease gutter allowing debris and liquid to drain away from said heat distribution panel.

* * * * *